Oct. 8, 1940.    R. A. JONES    2,216,916
INDICATING CALIPER
Filed April 19, 1939

INVENTOR.
REGINALD A. JONES
BY Thos. Donnelly
ATTORNEY.

Patented Oct. 8, 1940

2,216,916

UNITED STATES PATENT OFFICE 2,216,916

INDICATING CALIPER

Reginald A. Jones, Macomb County, Mich.

Application April 19, 1939, Serial No. 268,715

4 Claims. (Cl. 33—148)

My invention relates to a new and useful improvement in indicating calipers adapted for use in indicating measurements and particularly adapted for use in indicating internal dimensions of bores and the like as well as peripheral dimensions on solid bodies.

It is an object of the present invention to provide a calipers so arranged and constructed that very fine dimensions and measurements may be effected by the use of the instrument.

Another object of the invention is the provision of a pair of calipers having a pair of pivoted legs movable inwardly and outwardly of each other and provided with mechanism for securing on one of said legs an indicating device whereby measurements to a very fine degree may be indicated.

Another object of the invention is the provision in a calipers of this class of a leg having a bow-shaped portion positioned inwardly of the terminal portion and having means for securing an indicating member on the terminal portion in such a manner that the indicating needle will be visible through the bow-shaped portion thus affording a device which may be read from either side.

Another object of the invention is the provision of a calipers of this class which will be simple in structure, economical of manufacture, durable, compact, easily operated and highly efficient in use.

Other objects will appear hereinafter.

The invention consists in the combination and arrangement of parts hereinafter described and claimed.

The invention will be best understood by a reference to the accompanying drawing which forms a part of this specification, and in which, Fig. 1 is a front elevational view of the invention.

Figure 1:
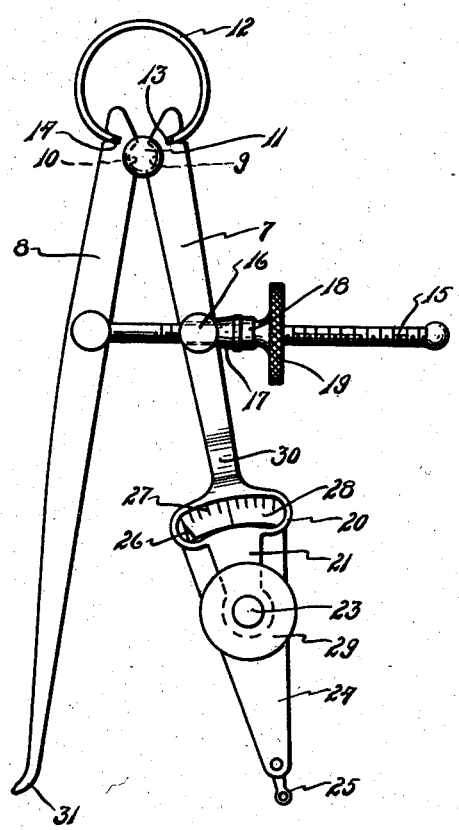
Figure 2:
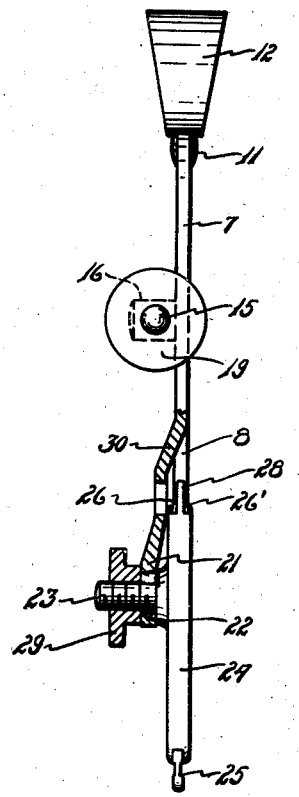
Fig. 2 is an end elevational view with parts broken away and parts shown in section.
Figure 3:
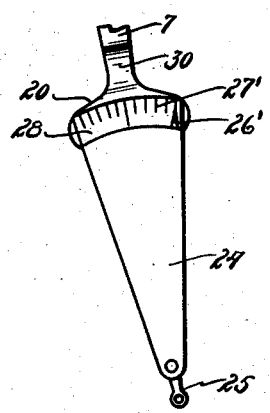
Fig. 3 is a fragmentary, side elevational view of one of the legs of the invention.

As shown in the drawing, the invention comprises a pair of legs 7 and 8 having semi-circular recesses 9 and 10 formed in opposed faces at one of their ends and in which is seated a pin or roller 11. A spring split ring 12 engages at its ends in the notches 13 and 14 formed in the outer faces of the ends of the legs 7 and 8 so that these legs are pivotally mounted on the pin or roller 11 and the split resilient ring 12 serves to normally tend to move the legs into separated relation. Secured at one of its ends to the leg 8 in pivotal relation thereto, is the threaded stem 15 projecting through the guide boss 16 swivelly mounted on the leg 7. A projection 17 projects outwardly from the boss 16 and provides an abutment for the nut 18 threaded on the threaded portion of the stem 15, this nut being provided with a knurled knob 19 to facilitate rotation of the same. The construction is such that the nut 18 will serve to resist outward relative movement of the legs 7 and 8 so that by threading the nut 18 inwardly and outwardly of the stem 15, the spread of the legs 7 and 8 may be determined.

The leg 7 is shorter than the leg 8 and formed on the leg 7 intermediate its ends is the bow 20 projecting beyond which a terminal portion or tongue 21 having a slot 22 formed therein and through which is adapted to project a stud 23 extending centrally upwardly from the indicator housing 24. This indicator housing carries suitable mechanism so that the rocking of the rockable indicator finger 25 will be indicated by a rocking of the pointer 26 on the graduations 27. On the opposite side of the plate 28 on which the graduations are formed is a similar indicating finger 26' similarly actuated, these graduations indicating very small dimensions. A nut 29 is threaded on the stud to secure the housing 24 in position on the tongue or terminal portion 21 so as to maintain the graduations in alignment with the bow 20.

The construction is such that these calipers may be used for indicating very fine dimensions and are particularly adapted for use in calipering internal bores and the like.

It will be noted that the leg 7 is offset as at 30 so that the indicator housing 24 forms an extension portion which is in alignment with the main body of the leg 7.

In the use of the device the operator would adjust the nut 18 until the legs 7 and 8 were moved relatively to each other so that the contact point 25 would be rocked to move the pointers 26 and 26' to zero or to the center graduation when the contact point of the leg 8 and the contact member 25 were engaged between the ends of a micrometer adjusted to the proper size. In inserting the contact point of the leg 8 and the contact member 25 into the bore, the pointers 26 and 26' would then be rocked out of zero position if the bore is undersized so that there is thus provided ready and accurate means for very closely measuring and sizing a bore or internal recess.

This eliminates all guess work and provides the caliper with an attachment whereby one is capable of maintaining mechanical accuracy in the measurements and the personal equation is eliminated.

Should it be desired to use the calipers for measuring external surfaces such as peripheries and the like, the contact end 31 of the leg 8 would be turned inwardly instead of outwardly as shown in Fig. 1 and the device would then function as previously described with all of the advantages of mechanical accuracy and close measurements.

By providing the graduations on opposite sides of the plate 28 and having the loop 20 provided with the opening therein, I have provided a caliper which may be read from either side so that it is accurately adapted for use by a right-handed person or a lefthanded person.

It is believed obvious that when the nut 22 is threaded down tightly, the indicator housing 24 will be accurately clamped in position against any movement so that it cannot move relatively to the leg 7 on which mounted. It is believed obvious that different types of indicators may be used with the device and easily and quickly attached in position, the presence of the slot 22 making the position to adjust the indicator housing a slight distance longitudinally of the leg 7.

While I have illustrated and described the preferred form of construction, I do not wish to limit myself to the precise details of structure shown but desire to avail myself of such variations and modifications as may come within the scope of the appended claims.

What I claim as new is:

1. A caliper of the class described comprising a pair of divergent relatively movable legs, one of said legs having a contact surface on its end, the other of said legs being offset intermediate its ends, out of the plane determined by said leg a loop on said offset leg, adjacent the offset portion, projecting laterally from opposite sides thereof, said leg having a tongue portion projecting outwardly beyond said loop, said offset portion having an opening formed therein adjacent its end.

2. A caliper of the class described comprising a pair of divergent relatively movable legs, one of said legs having a contact surface on its end, the other of said legs being offset intermediate its ends, out of the plane determined by said leg a loop on said offset leg, adjacent the offset portion, projecting laterally from opposite sides thereof, said leg having a tongue portion projecting outwardly beyond said loop, said offset portion having an opening formed therein adjacent its end; an indicator housing; a stud projecting outwardly from said housing and projected through said opening; a nut threaded on said stud for retaining said housing to provide an extension of said leg; and a contact member projecting outwardly from the end of said housing.

3. A caliper of the class described comprising a pair of divergent relatively movable legs, one of said legs having a contact surface on its end, the other of said legs being offset, intermediate its ends, out of the plane determined by said leg a loop on said offset leg, adjacent the offset portion, projecting laterally from opposite sides thereof, said leg having a tongue portion projecting outwardly beyond said loop, said offset portion having an opening formed therein adjacent its end; an indicator housing; a stud projecting outwardly from said housing and projected through said opening; a nut threaded on said stud for retaining said housing to provide an extension of said leg; and a contact member projecting outwardly from the end of said housing, said housing and the leg upon which mounted, together, being of a length substantially equal to the other of said legs.

4. A caliper of the class described comprising a pair of legs movably mounted at one of their ends on a pivot member and diverging from each other toward their opposite ends, one of said legs being shorter than the other; an offset portion on said shorter leg intermediate its ends, said offset portion lying in a plane other than the plane determined by said leg, said shorter leg being widened at said offset portion and an open loop formed in said widened portion; and a tongue portion projecting outwardly beyond said loop as a continuation of said shorter leg and having an opening formed therein.

REGINALD A. JONES.